(12) United States Patent
Koga et al.

(10) Patent No.: US 6,648,463 B2
(45) Date of Patent: Nov. 18, 2003

(54) WATER BASE INK FOR INK-JET RECORDING

(75) Inventors: Narumi Koga, Nagoya (JP); Kazuma Goto, Nagoya (JP); Naomichi Kobayashi, Nagoya (JP); Michiko Aoyama, Nagoya (JP); Shunichi Higashiyama, Yotsukaichi (JP); Masaya Fujioka, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 10/103,731

(22) Filed: Mar. 25, 2002

(65) Prior Publication Data

US 2003/0067524 A1 Apr. 10, 2003

(30) Foreign Application Priority Data

Mar. 29, 2001 (JP) ........................................ 2001-097014

(51) Int. Cl.[7] ........................... G01D 11/00; C01D 11/00
(52) U.S. Cl. .................................. 347/100; 106/31.27
(58) Field of Search ..................... 347/100; 106/31.27, 106/31.6, 31.13

(56) References Cited

U.S. PATENT DOCUMENTS

| | | | | |
|---|---|---|---|---|
| 4,605,939 A | * | 8/1986 | Hubbard et al. ............ | 347/71 |
| 5,034,058 A | * | 7/1991 | Akiyama et al. ......... | 106/31.51 |
| 5,281,262 A | * | 1/1994 | Saito ........................... | 523/161 |
| 5,402,159 A | | 3/1995 | Takahashi et al. | |
| 5,992,982 A | * | 11/1999 | Suzuki ......................... | 347/63 |

FOREIGN PATENT DOCUMENTS

| JP | A 62-101672 | 5/1987 |
|---|---|---|
| JP | A 4-341851 | 11/1992 |

OTHER PUBLICATIONS

ChemFinder, Definition of benzotriazole, retrieved on Oct. 23, 2002 from the Internet, URL: http//www.ChemfFnder.com.*

* cited by examiner

Primary Examiner—Judy Nguyen
Assistant Examiner—Michael S. Brooke
(74) Attorney, Agent, or Firm—Oliff & Berridge, PLC

(57) ABSTRACT

A water base ink for ink-jet recording comprises water, a coloring agent, a water-soluble organic solvent, and a benzotriazole-based metal-inactivating agent and alkanolamine. When the ink is used in an ink-jet recording apparatus which has the metal member containing nickel or nickel alloy in an ink supply passage, nickel is eluted from the metal member in an amount of not more than 50 ppm. The ink makes it possible to perform stable jetting operation for a long term without causing any deterioration of metal members of a discharge head due to the metallic corrosion and the elution of nickel into the ink.

6 Claims, 10 Drawing Sheets

WATER BASE INK FOR INK-JET RECORDING

BACKGROUND OF THE INVENTION

1. Field of the Invention

The present invention relates to a water base ink for ink-jet recording which avoids any metallic corrosion and elution of nickel from metal members included in a discharge head of an ink-jet recording apparatus and which makes it possible to perform highly accurate printing operation.

2. Description of the Related Art

The printer technique, which is based on the ink-jet recording system, resides in the following printing technique. That is, inks of several basic colors are converted into minute liquid droplets of several picoliters to several tens picoliters, and the minute liquid droplets are selectively landed on the paper so that an image is formed thereby, for example, by means of the bubble system in which the inks are discharged from minute nozzles by using bubbles generated by rapid heating operation, or the piezoelectric system in which the inks are discharged from minute nozzles by using piezoelectric elements which are deformable depending on application of voltage.

The ink-jet recording system has advantages of high printing quality and high printed image quality based on the control of discharge of the minute liquid droplets. An image, which has color reproducibility close to full-color and which has no granular texture, can be formed by highly accurately landing the minute liquid droplets of several picoliters on the paper. However, in order to successfully discharge the minute liquid droplets as described above, it is necessary to adapt a highly accurate technique for controlling the landing of the minute liquid droplets discharged from a sufficiently thin nozzle. In order to highly accurately discharge the ink from such a nozzle having a minute diameter, it is necessary to remove the dust and impurities from the ink. Therefore, it is necessary that the water base ink for ink-jet recording is subjected to precise filtration after preparing the ink. Further, it is necessary that materials, which have no compatibility with the ink and which are sufficiently washed, are used for all parts which make contact with the ink.

Several types of ink-jet recording apparatuses include metal members containing nickel or nickel alloy used for their discharge heads. When the ink is water-based, then the nickel is eluted into the ink as a result of long term contact, and metallic corrosion takes place in some cases. As a result, a problem arises as follows. That is, the metal member is deteriorated due to the elution of nickel and the metallic corrosion as described above, and it is impossible to highly accurately control the discharge and the landing operation.

SUMMARY OF THE INVENTION

The present invention has been made in order to solve the problem as described above, an object of which is to provide a water base ink for ink-jet recording which makes it possible to perform stable jetting operation for a long term without causing any deterioration of metal members of a discharge head due to the metallic corrosion and the elution of nickel into the ink and which makes it possible to perform highly reliable and highly accurate recording.

According to a first aspect of the present invention, there is provided an ink-jet printer comprising:

an ink-jet head which has at least a part of ink flow passage formed of nickel or nickel alloy;

ink which contains benzotriazole-based metal-inactivating agent; and an ink tank which accommodates the ink and which supplies the ink to the ink-jet head.

According to a second aspect of the present invention, there is provided an ink-jet printer comprising:

an ink-jet head which has at least a part of ink flow passage formed of nickel or nickel alloy;

ink which contains alkanolamine; and an ink tank which accommodates the ink and which supplies the ink to the ink-jet head.

In the printer of the present invention, the ink accommodated in the ink tank contains the benzotriazole-based metal-inactivating agent or alkanolamine. Therefore, the elution into the ink of nickel or nickel alloy which constitutes the ink-jet head is suppressed. Especially, it is possible to suppress the amount of elution of nickel to be not more than 50 ppm. In this specification, the amount of elution of nickel means the amount of elution of nickel obtained when a metal piece (surface area: about 4.5 $cm^2$, weight: about 1 g) is immersed in the ink of about 20 mL followed by being left to stand for 2 weeks under conditions of temperature of 60° C. and humidity of 40%.

According to a third aspect of the present invention, there is provided an ink for ink-jet recording comprising:

water;

a coloring agent;

a water-soluble organic solvent; and a benzotriazole-based metal-inactivating agent and alkanolamine. The present invention will be described in detail below.

DESCRIPTION OF THE PREFERRED EMBODIMENTS

As for the water base ink for ink-jet recording of the present invention, nickel is eluted from a metal member in an amount of not more than the certain amount when the water base ink for ink-jet recording is applied to an ink-jet recording apparatus which has the metal member containing nickel or nickel alloy in at least an ink supply passage to a discharge section for forming an image on paper by discharging fine and minute liquid droplets from a pore or small hole.

Figure 1:
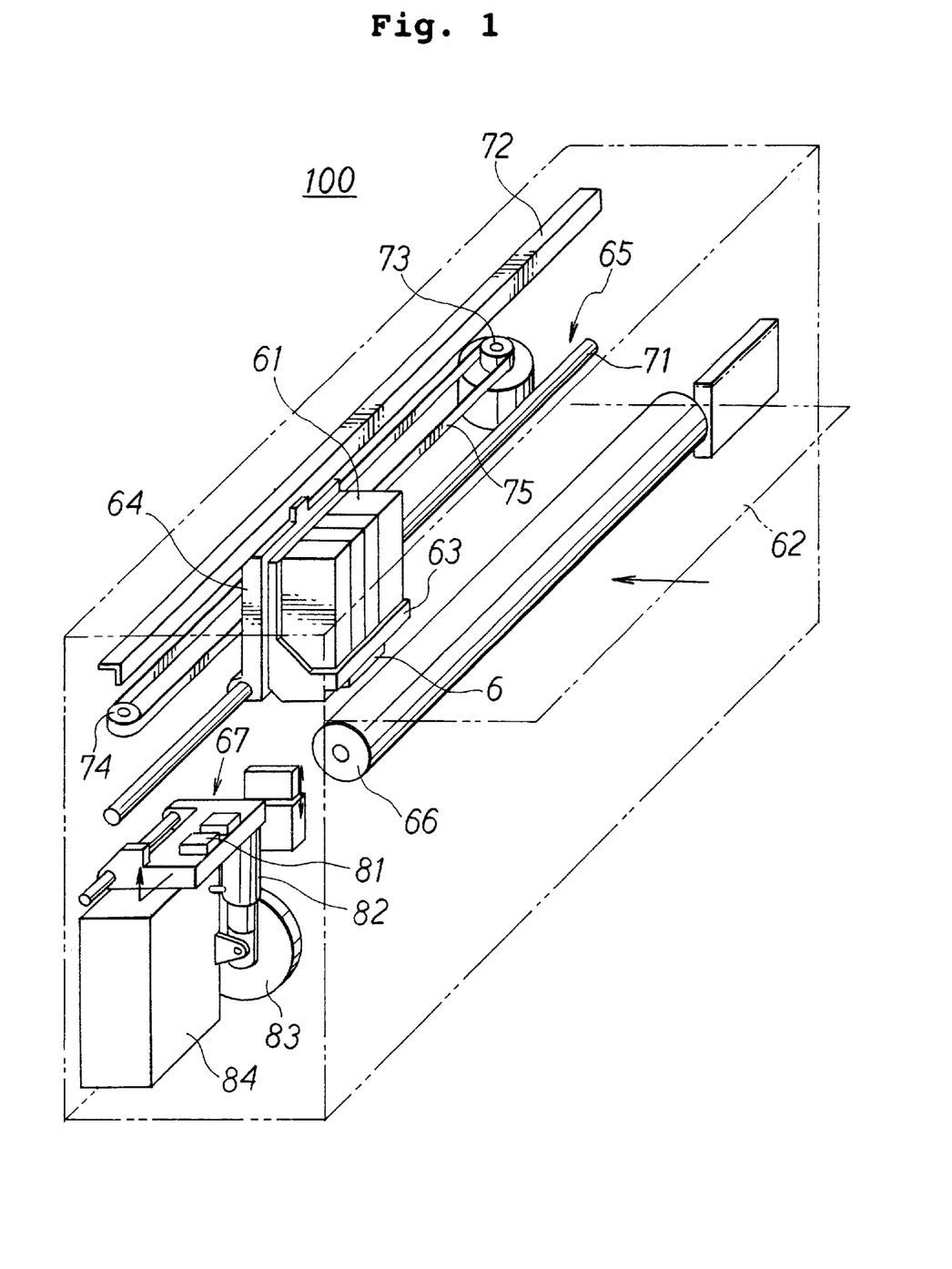
FIG. 1 shows a perspective view illustrating an embodiment of a color ink-jet printer as an ink-jet recording apparatus of the present invention.

FIG. 1 shows a perspective view illustrating an embodiment of a color ink-jet printer as a ink-jet recording apparatus of the present invention. With reference to FIG. 1, the color ink-jet printer 100 comprises ink cartridges 61 which are filled with, for example, four color inks of cyan, magenta, yellow, and black respectively, a head unit 63 which is provided with a piezoelectric ink-jet head 6 for performing the printing on the printing paper 62, a carriage 64 which carries the ink cartridges 61 and the head unit 63 thereon, a drive unit 65 which reciprocates the carriage 64 in the linear direction, a platen roller 66 which extends in the direction of reciprocating movement of the carriage 64 and which is arranged opposingly to the piezoelectric ink-jet head 6, and a purge unit 67.

The drive unit 65 comprises a carriage shaft 71 which is arranged at the lower end of the carriage 64 and which extends in parallel to the platen roller 66, a guide 72 which is arranged at the upper end of the carriage 64 and which extends in parallel to the carriage shaft 71, two pulleys 73, 74 which are disposed between the carriage shaft 71 and the guide 72 and which are arranged at both ends of the carriage shaft 71, and an endless belt 75 which extends across the pulleys 73, 74. A part of the endless belt 75 is joined to the back surface of the carriage 64.

When the first pulley 73 is rotated in accordance with the driving motion of a motor 76, the carriage 64, which is joined to the endless belt 75, is moved linearly along the carriage shaft 71 and the guide 72 in accordance with the rotation of the pulley 73.

The printing paper 62 is fed from an unillustrated paper feed cassette which is provided on the side of the ink-jet printer 100. The printing paper is introduced into the space between the piezoelectric ink-jet head 6 and the platen roller 66. Predetermined printing is performed on the printing paper with the ink discharged from the piezoelectric ink-jet head 6. After that, the printing paper is discharged. The paper feed mechanism and the paper discharge mechanism for the printing paper 62 are omitted from the illustration in FIG. 1.

The purge unit 67 is provided on the side of the platen roller 66. The purge unit 67 is arranged so that the purge unit 67 is opposed to the piezoelectric ink-jet head 6 when the head unit 63 is disposed at the reset position. The purge unit 67 is provided with caps 81 which abut against open surfaces of nozzles to cover the plurality of nozzles of the piezoelectric ink-jet head 6 as described later on, a pump 82, a cam 83, and an ink storage unit 84. When the head unit 63 is at the reset position, then the nozzles of the piezoelectric ink-jet head 6 are covered with the caps 81, and the ink including bubbles or the like, which remains in the piezoelectric ink-jet head 6, is aspirated by the pump 82 in accordance with the driving motion of the cam 83 in order to recover the piezoelectric ink-jet head 6 thereby. Accordingly, it is possible to avoid any discharge failure or the like which would be otherwise caused, for example, by the growth of bubbles and the retention of the ink when the ink is introduced at the initial stage. The aspirated defective ink is stored in the ink storage unit 84.

Figure 2:
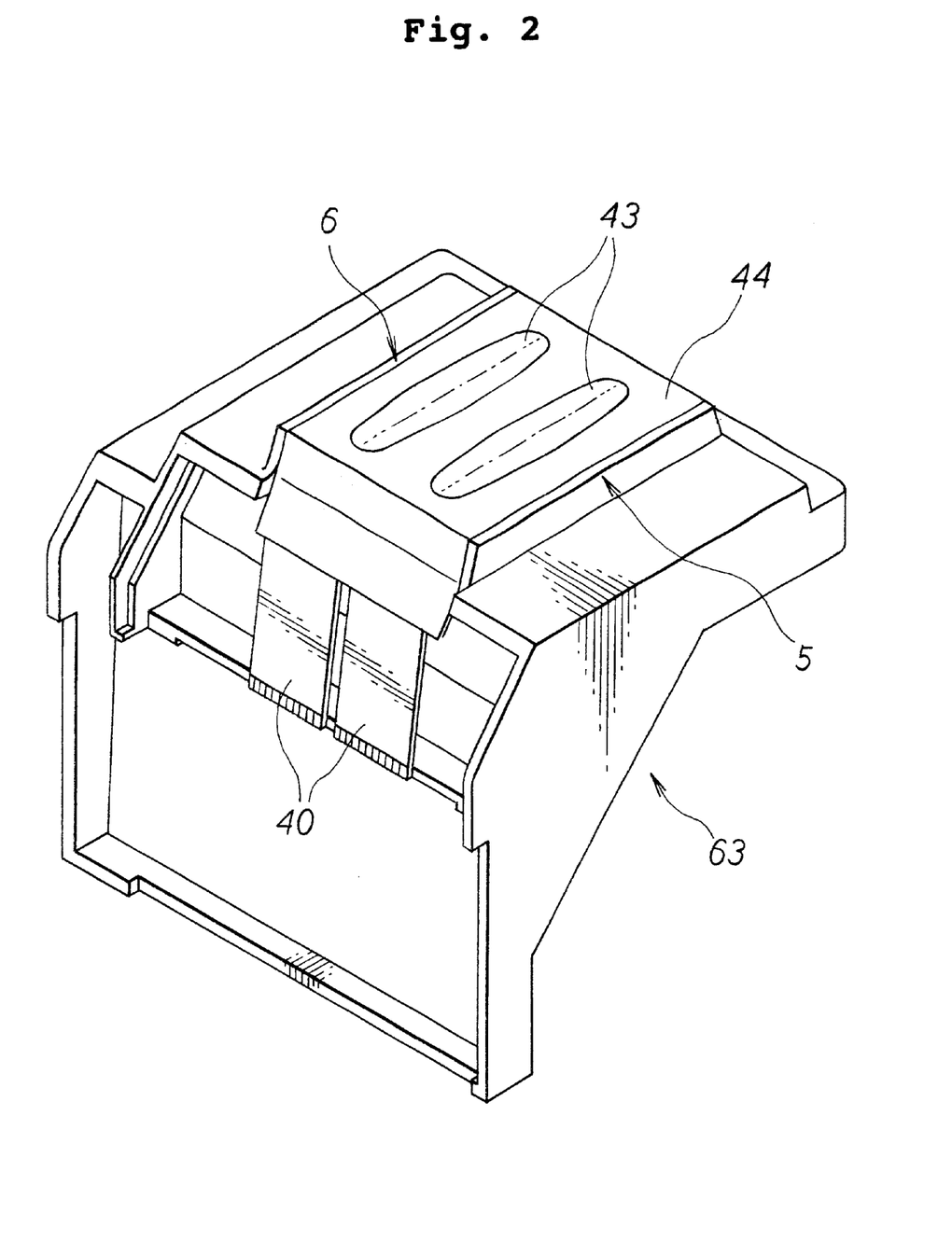
FIG. 2 shows a perspective view illustrating a head unit as viewed from the side of nozzles.
Figure 3:
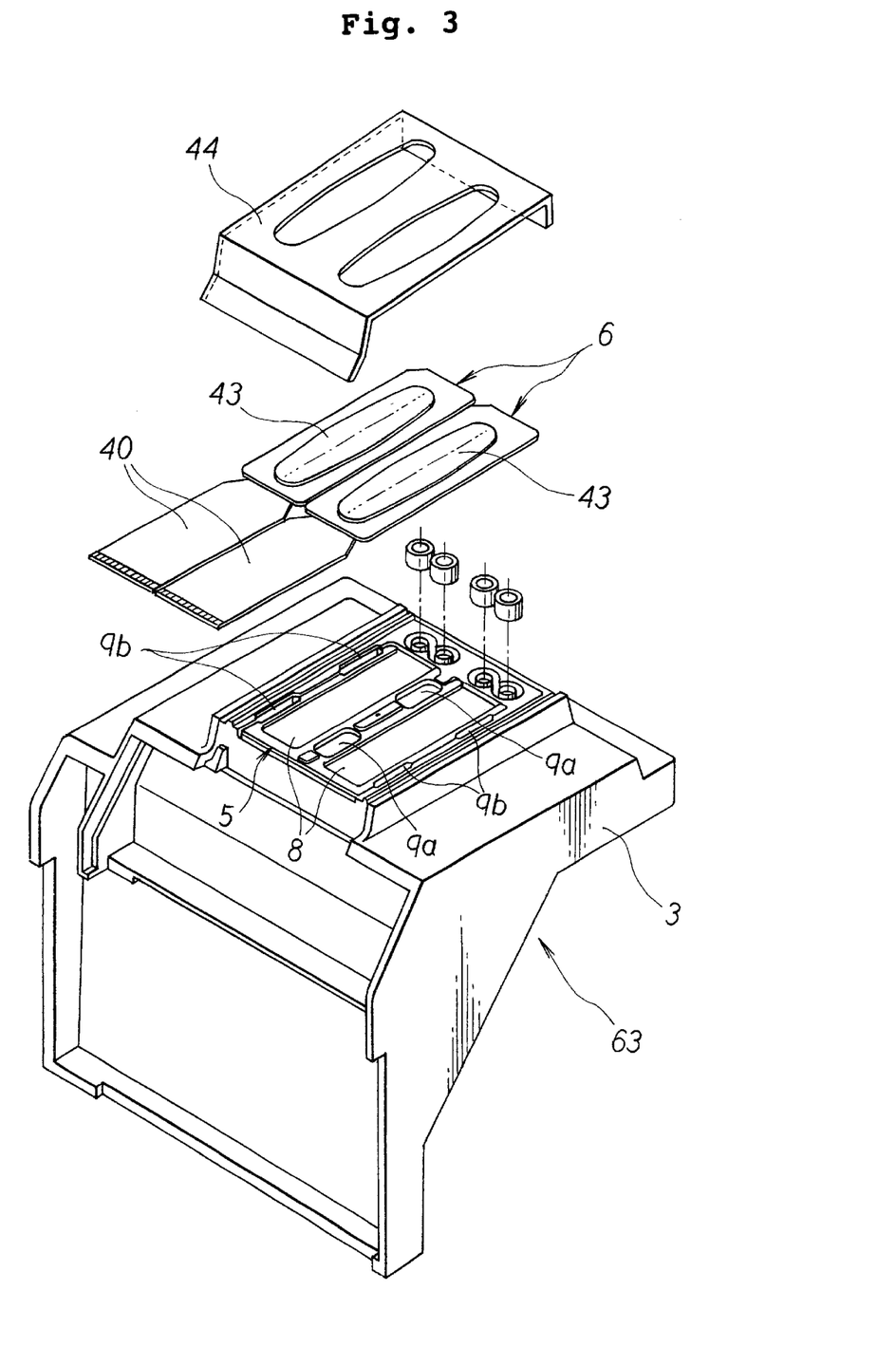
FIG. 3 shows an exploded perspective view illustrating parts of the head unit.
Figure 4:
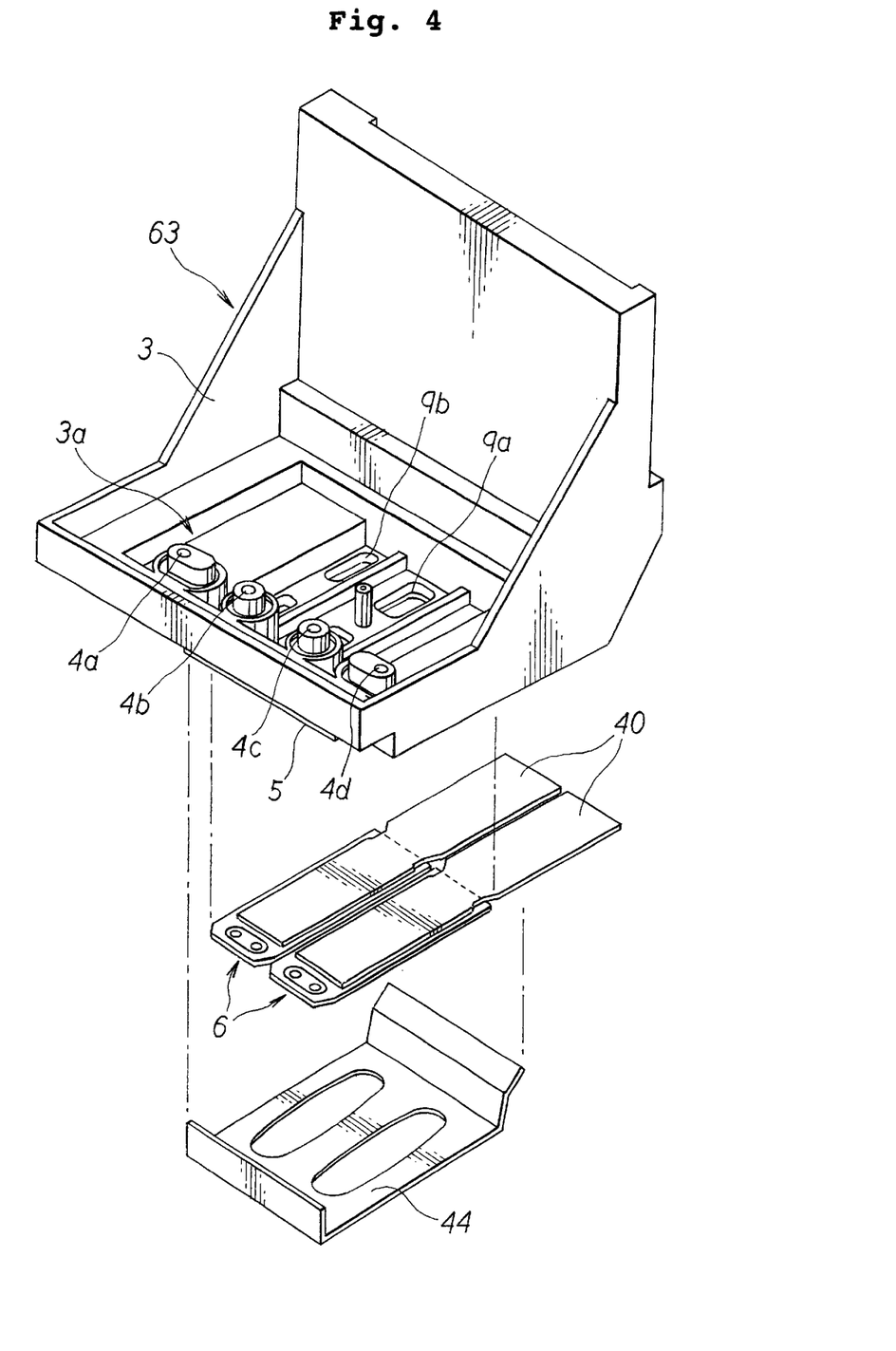
FIG. 4 shows an exploded perspective view illustrating parts of the head unit, in which the color ink-jet printer is viewed from a position thereover.
Figure 5:
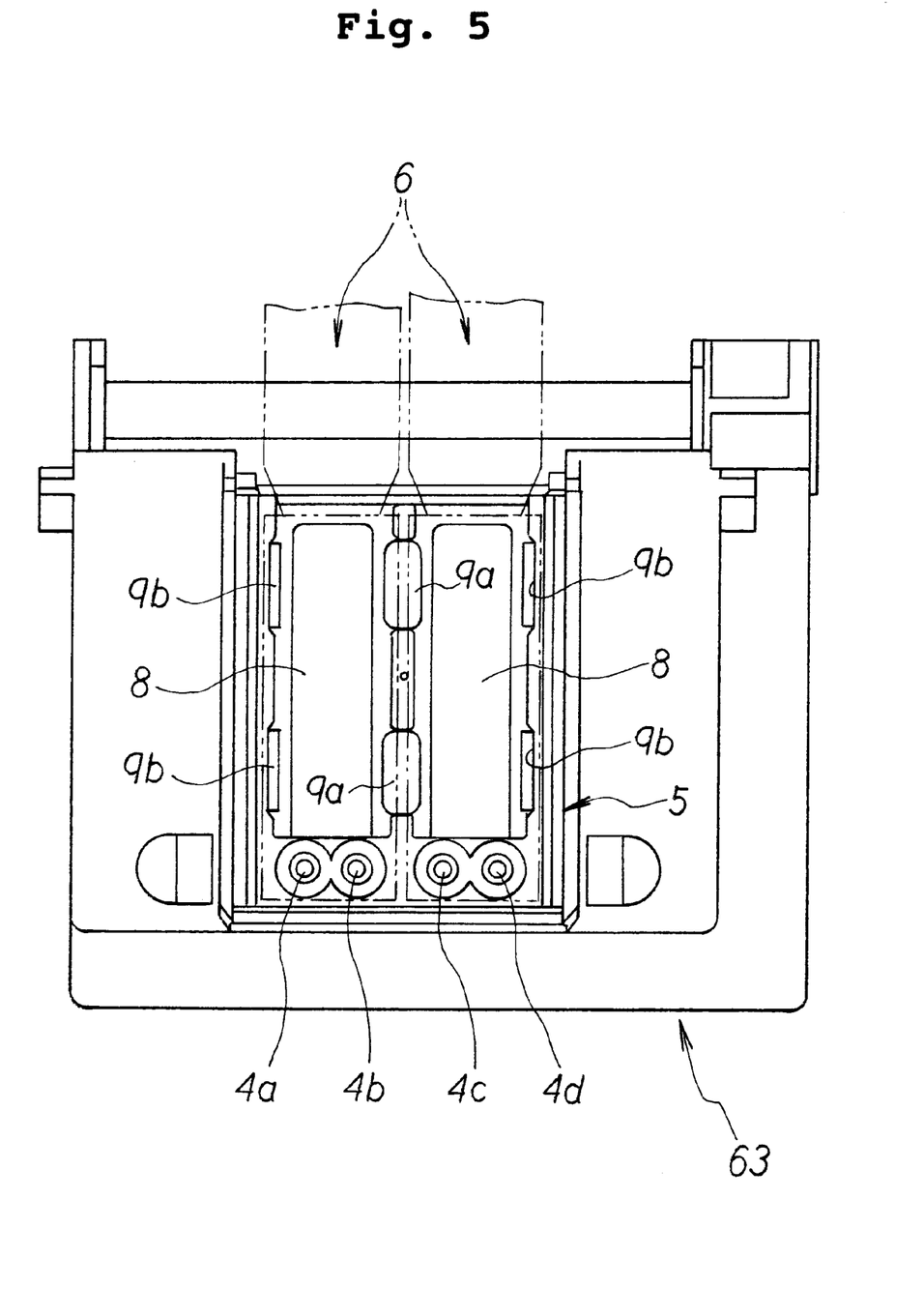
FIG. 5 shows a bottom view illustrating the head unit.

FIGS. 2, 3, and 4 show perspective views of the head unit 63. FIG. 5 shows a bottom view of the head unit 63.

As shown in FIG. 4, the head unit 63, which is carried on the carriage 64 that runs along the printing paper 62, is formed to have a substantially box-shaped configuration with its open upper surface. The head unit 63 has a carrying section 3 to which the four ink cartridges 61 can be detachably installed from positions thereover. Ink supply passages 4a, 4b, 4c, 4d, which are connectable to ink discharge sections (not shown) of the respective ink cartridges 61, make communication up to the lower surface of the bottom plate 5 of the head unit 63 on the first side 3a of the carrying section 3. A packing made of rubber or the like (not shown), which is designed to make tight contact with each of the ink discharge sections (not shown) of the respective ink cartridges 61, is arranged on the upper surface on the first side 3a of the carrying section 3.

The bottom plate 5 is formed horizontally to protrude at a position stepped downwardly from the carrying section 3. As shown in FIGS. 3 and 5, two support sections 8, which are provided to arrange the two piezoelectric ink-jet heads 6 in parallel, are formed in a stepped configuration on the lower surface side of the bottom plate 5. A plurality of hollow portions 9a, 9b are formed to vertically penetrate through the respective support sections 8 in order to make fixation with a UV-curable adhesive.

Figure 6:
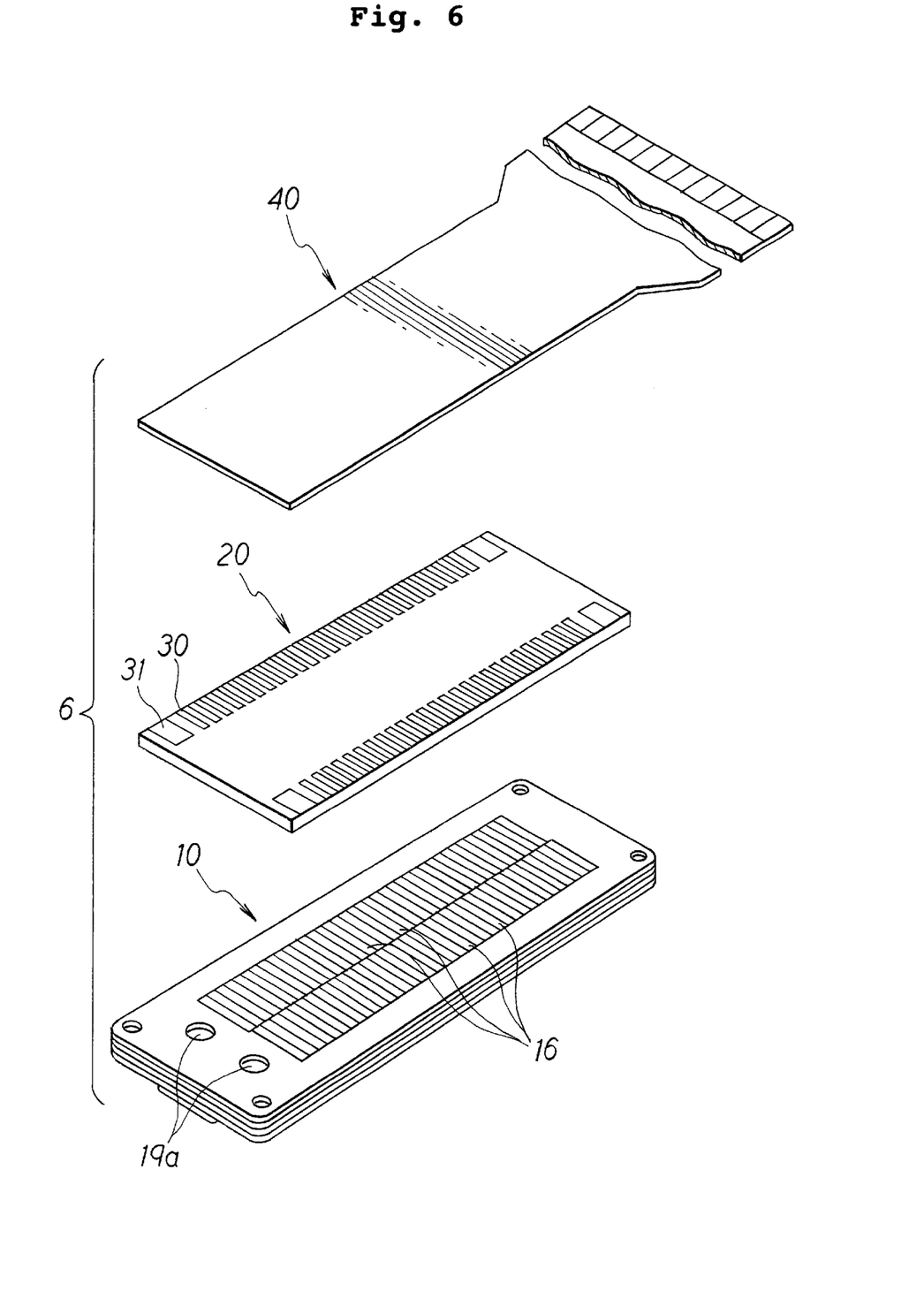
FIG. 6 shows a perspective view illustrating respective parts of a piezoelectric ink-jet head.
Figure 7:
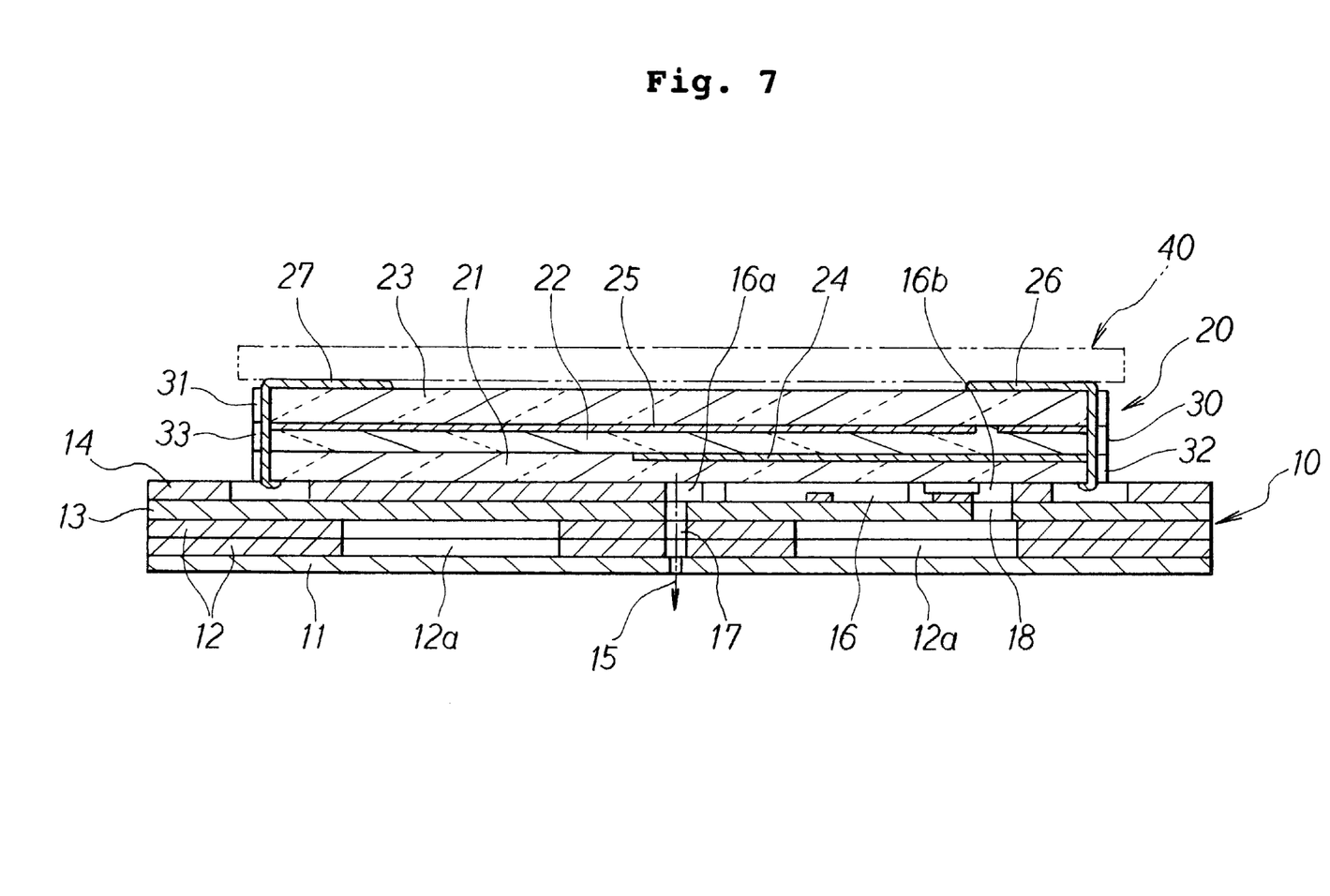
FIG. 7 shows a sectional view illustrating the piezoelectric ink-jet head.

FIG. 6 shows a perspective view illustrating the piezoelectric ink-jet head 6. FIG. 7 shows a sectional view illustrating the piezoelectric ink-jet head 6. As shown in FIG. 6, the piezoelectric ink-jet head 6 comprises a stacked type cavity plate 10, a plate type piezoelectric actuator 20 which is bonded and stacked onto the cavity plate 10 with an adhesive or an adhesive sheet (not shown), and a flexible flat cable 40 which is superimposed and joined onto the upper surface of the plate type piezoelectric actuator 20 in order to make electric connection with respect to external equipment. The ink, which is supplied from the ink cartridge 61, is discharged downwardly (in the downward direction in FIG. 6) from the nozzles opened on the lower surface side (lower side in FIG. 6) through supply ports 19a provided on the upper surface side (upper side in FIG. 6) of the cavity plate 10.

Figure 8:
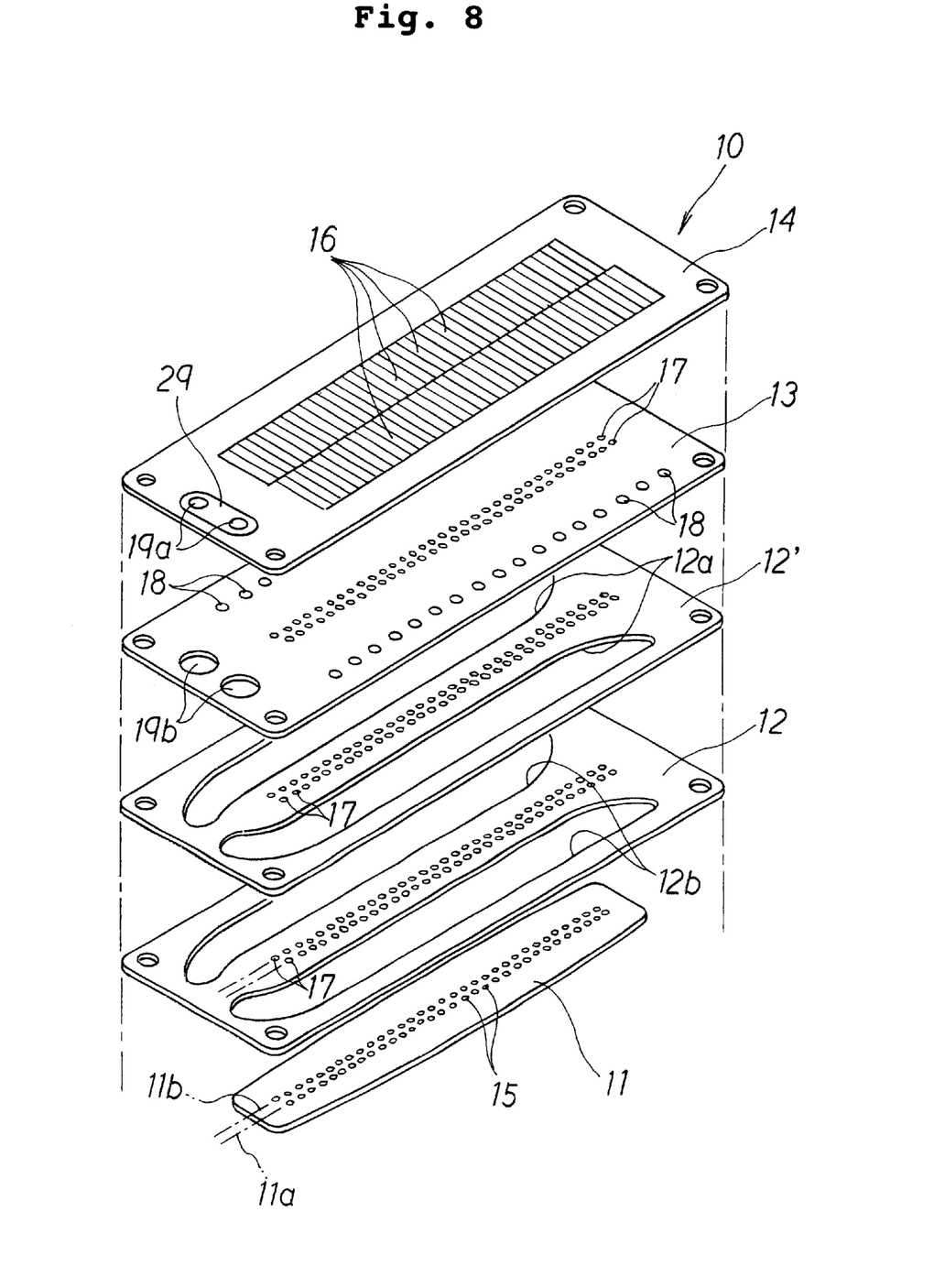
FIG. 8 shows an exploded perspective view illustrating a cavity plate.
Figure 9:
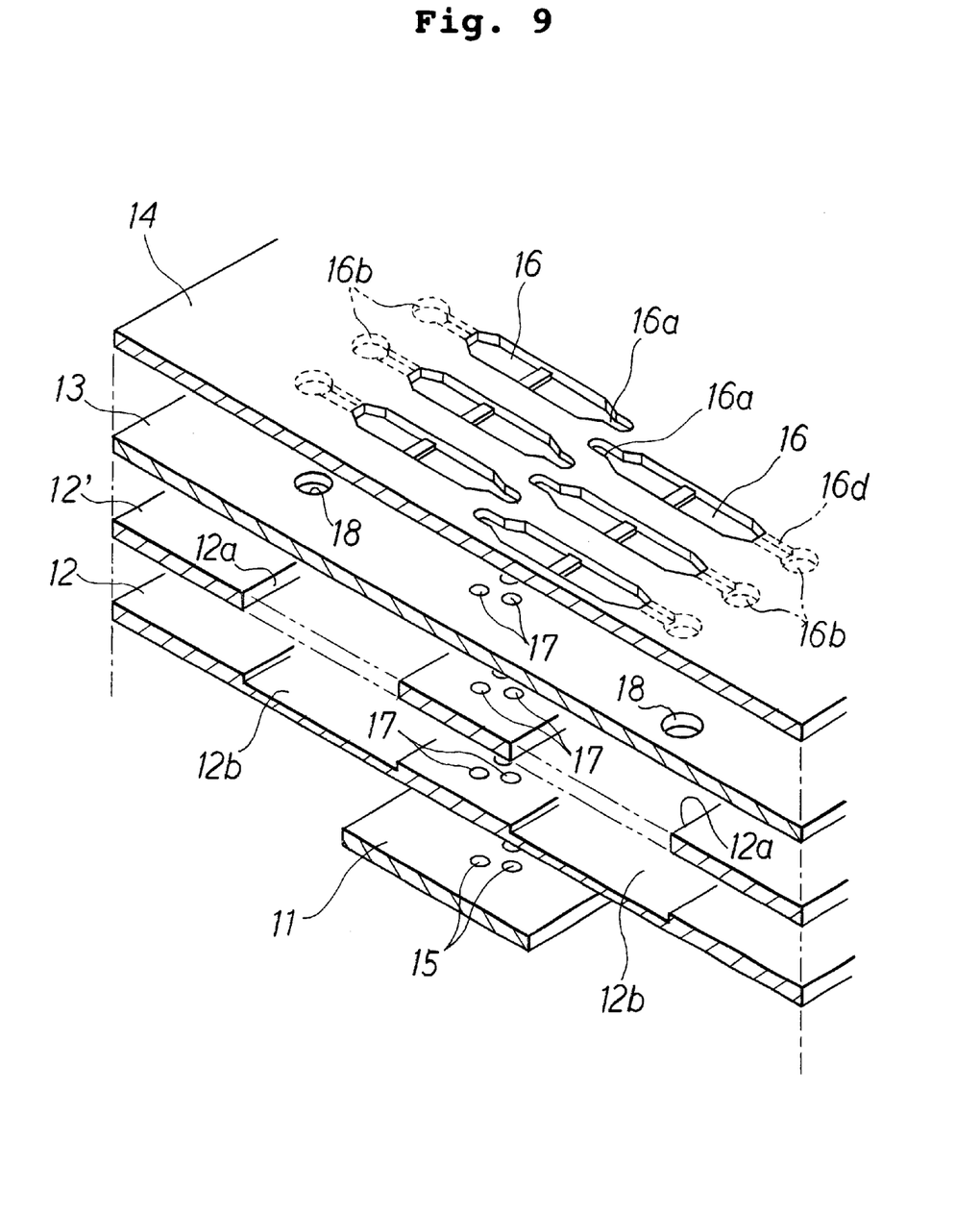
FIG. 9 shows a magnified exploded perspective view illustrating the cavity plate.

FIG. 8 shows an exploded perspective view illustrating the cavity plate 10. FIG. 9 shows a magnified exploded perspective view illustrating the cavity plate 10. The cavity plate 10 has a structure comprising five thin metal plates of a nozzle plate 11, two manifold plates 12, 12', a spacer plate 13, and a base plate 14 which are superimposed, joined, and stacked with an adhesive respectively. In this embodiment, each of the plates 11 to 14 is made of 42% nickel alloy steel plate (42 alloy) with a thickness of about 50 to 150 $\mu$m.

As shown in FIG. 9, a plurality of pressure chambers 16, which are slender and which extend in a direction perpendicular to the longitudinal direction of the base plate 14, are bored in two rows in a zigzag arrangement through the base plate 14. Throttle sections 16d connected to the respective pressure chambers 16 and ink supply holes 16b connected to the throttle sections 16d are formed in a recessed form on the base plate 14 on the side of the spacer plate 13. The respective ink supply holes 16b are communicated with a common ink chamber 12a in the manifold plate 12' via respective ink supply holes 18 which are bored through both right and left side portions of the spacer plate 13.

First ends 16a of the respective pressure chambers 16 are communicated with the nozzles 15 which are arranged in a zigzag arrangement in the nozzle plate 11, via through-holes 17 each having a minute diameter bored in a zigzag arrangement as well through the spacer plate 13 and the two manifold plates 12, 12'.

As shown in FIG. 8, the two ink supply holes 19a, 19b, which are provided to supply the ink from the common ink cartridge to the two common ink chambers 12a in the manifold plate 12', are bored through each of the base plate 14 and the spacer plate 13.

As shown in FIG. 8, the two common ink chambers 12a, 12b are provided for each of the two manifold plates 12, 12' with the row of the plurality of nozzles 15 of the nozzle plate 11 intervening therebetween. The common ink chambers 12a, 12b extend over a long distance in parallel to the row of the nozzles. The common ink chambers 12a, 12b are located in the planes parallel to the plane formed by the plurality of pressure chambers 16 in the base plate 14. Further, the common ink chambers 12a, 12b are positioned on the side of the open surface of the plurality of nozzles 15 on the nozzle plate 11 as compared with the plurality of pressure chambers 16.

The ends of the common ink chambers 12a, 12b are bent toward the center in order to make communication, for example, with the ink supply holes 19a, 19b. In this structure, the upper surfaces of the upper common ink chambers 12a are tightly closed by the spacer plate 13 stacked on the manifold plate 12'. The lower common ink chambers 12b are formed in a recessed form on the manifold plate 12 with their closed bottom surfaces.

In this structure, the common ink chambers 12a, 12b are tightly closed by the nozzle plate 11 and the spacer plate 13 stacked on the two manifold plates 12. The plurality of ink discharge nozzles 15 each having a minute diameter (for example, about 25 µm) are bored in two rows through the nozzle plate 11 in the longitudinal direction of the nozzle plate 11.

The cavity plate 10 is constructed as described above. Accordingly, the ink, which flows into the common ink chambers 12a, 12b from the ink supply holes 19a, 19b bored through the first end portions of the base plate 14 and the spacer plate 13, passes from the common ink chambers 12a through the respective ink supply holes 18, the respective ink supply holes 16b, and the throttle sections 16d, and the ink is distributed to the respective pressure chambers 16. The ink flows in the direction toward the first ends 16a of the respective pressure chambers 16. The ink passes through the respective through-holes 17, and the ink arrives at the nozzles 15 corresponding to the respective pressure chambers 16.

Figure 10:
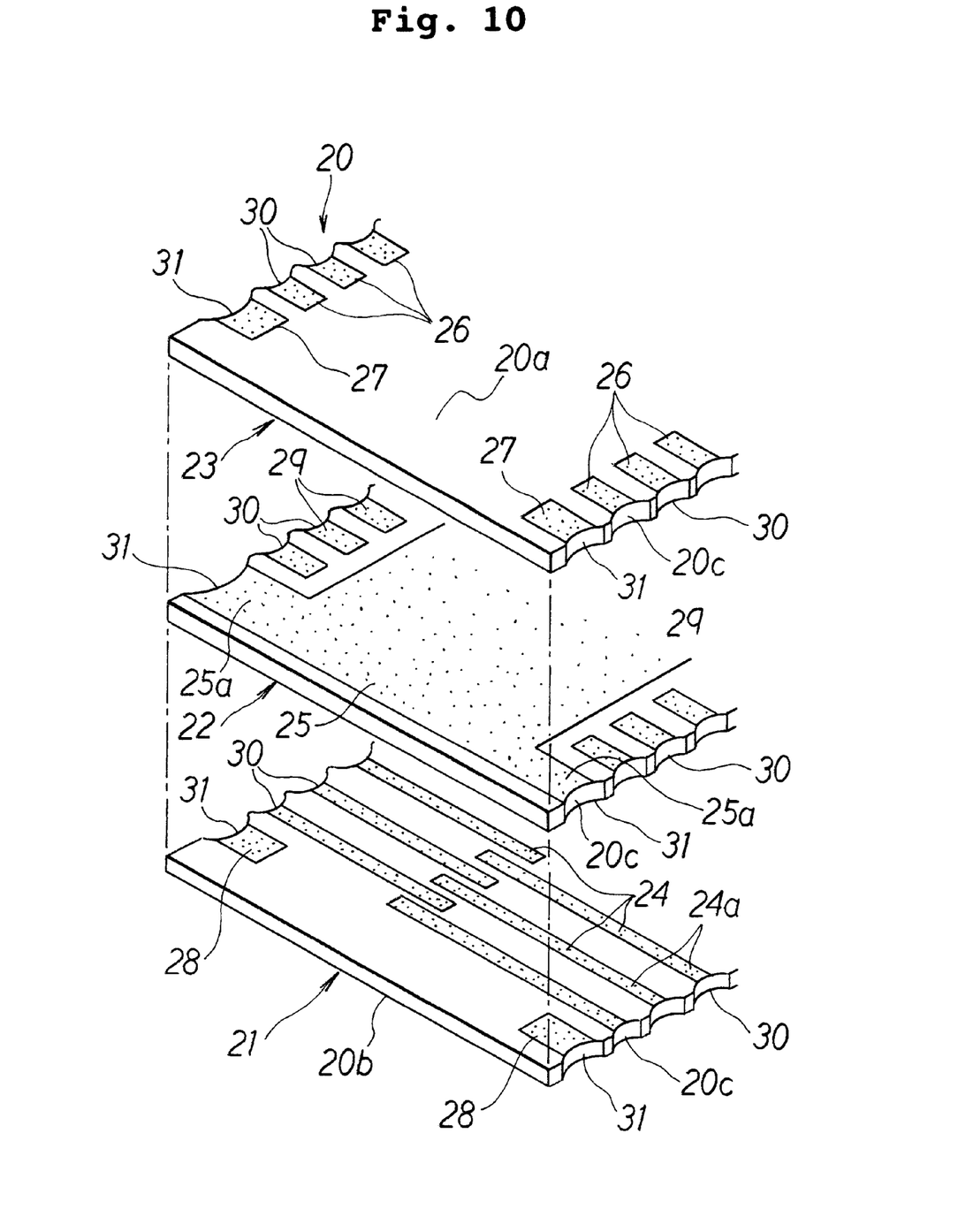
FIG. 10 shows a magnified exploded perspective view illustrating a piezoelectric actuator.

FIG. 10 shows a magnified exploded perspective view illustrating the piezoelectric actuator 20. As shown in FIG. 10, the piezoelectric actuator 20 has a structure in which two piezoelectric sheets 21, 22 and one insulating sheet 23 are stacked. A plurality of driving electrodes 24, which have a line width corresponding to each of the pressure chambers 16 of the cavity plate 10, are provided in a zigzag arrangement on the upper surface of the piezoelectric sheet 21 disposed at the lowermost layer. First ends 24a of the respective driving electrodes 24 are formed so that they are exposed to the right and left side surfaces 20c perpendicular to the front and back surfaces 20a, 20b of the piezoelectric actuator 20.

A common electrode 25, which is common to the plurality of pressure chambers 16, is provided on the upper surface of the piezoelectric sheet 22 disposed at the next layer. First ends 25a of the common electrode 25 are also formed so that they are exposed to the right and left side surfaces 20c in the same manner as the first ends 24a of the respective driving electrodes 24. Respective areas in the piezoelectric sheet 22, which are interposed between the respective driving electrodes 24 and the common electrode 25, serve as pressure-producing parts corresponding to the respective pressure chambers 16.

Surface electrodes 26 corresponding to the respective driving electrodes 24 and surface electrodes 27 corresponding to the common electrode 25 are provided on the upper surface of the insulating sheet 23 disposed at the uppermost layer so that they are aligned along the right and left side surfaces 20c.

First recessed grooves 30 disposed at the first ends 24a of the respective driving electrodes 24 and second recessed grooves 31 disposed at the first ends 25a of the common electrode 25 are provided on the right and left side surfaces 20c so that they extend in the stacking direction respectively. As shown in FIG. 7, side surface electrodes 32, which electrically connect the respective driving electrodes 24 and the respective surface electrodes 26, are formed in the respective first recessed grooves 30. Side surface electrodes 33, which electrically connect the common electrode 25 and the surface electrodes 27, are formed in the second recessed grooves 31. Electrodes of reference numerals of 28, 29 are electrodes of extra pattern.

The cavity plate 10 and the piezoelectric actuator 20, which are constructed as described above, are stacked so that the respective pressure chambers 16 of the cavity plate 10 correspond to the driving electrodes 24 of the piezoelectric actuator 20. The flexible flat cable 40 is superimposed and pressed on the upper surface 20a of the piezoelectric actuator 20. Accordingly, various wiring patterns (not shown) of the flexible flat cable 40 are electrically joined to the respective surface electrodes 26, 27.

In the ink-jet printer constructed as described above, the printing paper 62 is fed from the unillustrated paper feed cassette. When the printing paper 62 is introduced into the space between the piezoelectric ink-jet head 6 and the platen roller 66, the carriage 64 is moved from the reset position to a predetermined position along the guide plate 72 in accordance with the driving motion of the motor 76.

When a voltage is applied between the common electrode 25 and an arbitrary driving electrode 24 of the respective driving electrodes 24 of the piezoelectric actuator 20 of the piezoelectric ink-jet head 6, a certain strain is generated in the stacking direction by the piezoelectric action at a portion of the driving electrode 24 of the piezoelectric sheet 22 to which the voltage is applied, i.e., at the pressure-producing part. The internal volume of the pressure chamber 16 corresponding to each of the driving electrodes 24 is decreased by the pressure caused by the strain. Accordingly, the ink in the pressure chamber 16 is discharged in a droplet form from the nozzle 15, and the predetermined printing operation is performed on the printing paper 62. Thus, the printing operation is advanced on the printing paper 62 while making the reciprocating movement of the carriage 64 in the linear direction along the guide plate 72. When the printing operation is completed, the head unit 63, which is carried on the carriage 64, is returned to the reset position. The plurality of nozzles 15 of the piezoelectric ink-jet head 6 are covered with the caps 81.

As for the water base ink for ink-jet recording of the present invention, the amount of elution of nickel from the metal members which compose the piezoelectric ink-jet head 6 and the ink flow passage is not more than 50 ppm. If the elution amount exceeds 50 ppm, then the metal member is deteriorated due to the metallic corrosion, and it is impossible to highly accurately control the discharge landing.

The water base ink for ink-jet recording as described above includes those containing water, a water-soluble organic solvent, and a coloring agent which is capable of being dispersed or dissolved in water, and further containing a benzotriazole-based metal-inactivating agent and/or alkanolamine.

The water is not specifically limited. However, it is preferable to use deionized water or pure water. It is preferable that the content of water is not less than 40% by weight with respect to the total weight of the ink. If the content is less than 40% by weight, it is difficult that the viscosity of the ink in the ordinary state is maintained to be a low viscosity at which the ink can be normally jetted.

The water-soluble organic solvent is principally used in order to avoid the dry-up and the occurrence of deposition from the ink at the forward end of the ink-jet head. Therefore, it is preferable to use solvents having low volatility and high solubility for dye, including, for example, polyalkylene glycol such as polyethylene glycol; alkylene glycol such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, 1,5-pentanediol, and hexylene glycol; glycerol; and pyrrolidone such as 2-pyrrolidone and N-methyl-2-pyrrolidone. The water-soluble organic solvent as described above may be used singly. Alternatively, two or more of the water-soluble organic solvents may be used in combination.

It is preferable that the content of the water-soluble organic solvent is 5 to 40% by weight with respect to the total amount of the ink. If the content is less than 5% by weight, then the moistening function is insufficient, and problems such as deposition and dry-up arise in some cases. On the other hand, if the content exceeds 40% by weight, then the viscosity of the ink is unnecessarily increased, and problems arise in some cases such that the ink cannot be discharged and the ink is dried extremely slowly on the recording paper. The content is more preferably 7 to 40% by weight, and much more preferably 10 to 30% by weight.

Those usable as the coloring agent include, for example, dyes and pigments. Those preferably usable as the dye include, for example, cationic and anionic dyes such as basic dye, acidic dye, direct dye, and reactive dye. The dye as described above is not specifically limited, including, for example, Color Index Numbers of Basic Red 1, 1:1, 2, 12, 13, 14, 18, 22, 27, 28, 29, 34, 38, 39, 46, 46:1, 67, 69, 70; Color Index Numbers of Basic Violet 1, 2, 3, 4, 5, 7, 8, 10, 11, 11:1, 20, 33; Color Index Numbers of Basic Blue 3, 6, 7, 9, 11, 12, 16, 17, 24, 26, 41, 47, 66; Color Index Numbers of Basic Green 1, 4, 5; Color Index Numbers of Basic Yellow 1, 11, 19, 21, 24, 25, 28, 29, 36, 45, 51, 67, 73; Color Index Numbers of Basic Orange 14, 21, 22, 32; Color Index Numbers of Basic Brown 1, 4; Color Index Numbers of Direct Black 17, 19, 32, 51, 71, 108, 146, 154, 168; Color Index Numbers of Direct Blue 6, 22, 25, 71, 86, 90, 106, 199; Color Index Numbers of Direct Red 1, 4, 17, 28, 83, 227; Color Index Numbers of Direct Yellow 12, 24, 26, 86, 98, 132, 142; Color Index Numbers of Direct Orange 34, 39, 44, 46, 60; Color Index Numbers of Direct Violet 47, 48; Color Index Number of Direct Brown 109; Color Index Number of Direct Green 59; Color Index Numbers of Acid Black 2, 7, 24, 26, 31, 52, 63, 112, 118; Color Index Numbers of Acid Blue 9, 22, 40, 59, 93, 102, 104, 113, 117, 120, 167, 229, 234; Color Index Numbers of Acid Red 1, 6, 32, 37, 51, 52, 80, 85, 87, 92, 94, 115, 181, 256, 289, 315, 317; Color Index Numbers of Acid Yellow 11, 17, 23, 25, 29, 42, 61, 71; Color Index Numbers of Acid Orange 7, 19; Color Index Number of Acid Violet 49; Color Index Numbers of Food Black 1, 2; and Color Index Number of Reactive Red 180.

Those usable as the pigment include many inorganic and organic pigments as well as carbon black. The pigment is not specifically limited provided that the pigment is capable of being dispersed in the aqueous phase. The pigment includes, for example, azo pigment such as azo lake pigment, insoluble azo pigment, condensed azo pigment, and chelate azo pigment; polycyclic pigment such as phthalocyanine pigment, perylene, perynone pigment, anthraquinone pigment, quinacridone pigment, dioxazine pigment, thioindigo pigment, isoindolinone pigment, and quinophthalone pigment; dye lake such as basic dye type lake and acidic dye type lake; organic pigment such as nitro pigment, nitroso pigment, and aniline black daylight fluorescent pigment; and inorganic pigment such as titanium oxide, iron oxide-based pigment, and carbon black-based pigment. For example, those obtained by applying a surface treatment to the various pigments described above, for example, with a surfactant or a macromolecular dispersing agent can be also used as the pigment. Such a material includes, for example, graft carbon.

When the pigment as described above is used as the coloring agent, a dispersing treatment is performed in accordance with a conventionally known method together with an appropriate dispersing agent, a solvent, pure water, and optionally other additives.

Those usable as the dispersing agent include, for example, a surfactant and a macromolecular dispersing agent to be used to disperse the pigment as described in Japanese Patent Application Laid-Open No. 62-101672.

The macromolecular dispersing agent is not specifically limited, including, for example, protein such as gelatin and albumin; natural rubber such as gum arabic and gum traganth; glucoside such as saponin; cellulose derivative such as methyl cellulose, carboxy cellulose, and hydroxymethyl cellulose; natural macromolecule such as lignosulfonate and shellac; anionic macromolecule such as salt of polyacrylic acid, salt of styrene-acrylic acid copolymer, salt of vinylnaphthalene-acrylic acid copolymer, salt of styrene-maleic acid copolymer, salt of vinylnaphthalene-maleic acid copolymer, and sodium salt and phosphoric acid salt of β-naphthalenesulfonic acid-formalin condensate; and nonionic macromolecule such as polyvinyl alcohol, polyvinyl pyrrolidone, and polyethylene glycol.

The surfactant includes, for example, anionic surfactant such as higher alcohol sulfuric acid ester salt, liquid fatty oil sulfuric acid ester salt, and alkylarylsulfonic acid salt; and nonionic surfactant such as polyoxyethylene alky ether, polyoxyethylene alkyl ester, sorbitan alkyl ester, and polyoxyethylene sorbitan alkyl ester. The dispersing agent may be used singly, or two or more of the dispersing agents may be used in combination.

It is preferable that the dispersing agent is generally blended in an amount of 0.01 to 20% by weight with respect to the total amount of the ink. If the blending amount is less than 0.01% by weight, or if the blending amount exceeds 20% by weight, then the dispersion stability of the pigment is insufficient, sometimes resulting in destruction of dispersion such as aggregation and sedimentation of the pigment.

The dispersing machine, which is used for the dispersing treatment for the pigment as described above, is not specifically limited. It is possible to widely use general dispersing machines. However, the dispersing machine includes, for example, ball mills, roll mills, and sand mills. Especially, it is preferable to use a high speed type sand mill.

The dye and the pigment may be used singly respectively. Alternatively, two or more dyes, two or more pigments, or two or more dyes and pigments may be mixed and used. It is preferable that the blending amount of the coloring agent is generally 0.1 to 20% by weight with respect to the total weight of the ink. If the blending amount is less than 0.1% by weight, it is difficult to obtain a sufficient printing density. If the blending amount exceeds 20% by weight, then the dye fails to be sufficiently dissolved in the solvent resulting in deposition in some cases, and the pigment hardly maintains the dispersion stability. The blending amount is more preferably 0.3 to 1.5% by weight, and much more preferably 0.5 to 10% by weight.

The present inventors have found out that the elution of nickel from the metal member of the discharge head and the metallic corrosion accompanied thereby can be suppressed by adding the benzotriazole-based metal-inactivating agent and/or alkanolamine to the ink. It is considered that the benzotriazole-based metal-inactivating agent and alkanolamine form a dense synthetic coating on the metal surface, and the coating functions as a protective film against corrosion to suppress the corrosion. It is preferred that both of a benzotriazole-based metal-inactivating agent and/or alkanolamine are added to the ink.

The benzotriazole-based metal-inactivating agent is not specifically limited provided that the agent functions as described above. The benzotriazole-based metal-inactivating agent includes, for example, compounds having the benzotriazole skeleton such as 1,2,3-benzotriazole, 1,2,3-benzotriazole sodium salt, methyl-1H-benzotriazole, methyl-1H-benzotriazoleamine salt, 2-(2'-hydroxy-5'-methylphenyl)benzotriazole, and 1-(N,N-bis(2-ethylhexyl)aminomethyl)benzotriazole.

The alkanolamine is not specifically limited provided that it functions as described above. The alkanolamine includes, for example, ethanolamine, diethanolamine, and triethanolamine.

A sufficient effect can be obtained even when each of the benzotriazole-based metal-inactivating agent and alkanolamine is used singly. However, when two or more species of the benzotriazole-based metal-inactivating agent and alkanolamine are used in mixture, it is possible to expect a higher effect.

It is preferable that the content of the benzotriazole-based metal-inactivating agent or alkanolamine is 0.01 to 5% by weight with respect to the total amount of the ink. If the content is less than 0.01% by weight, it is impossible to obtain any sufficient suppressing power against the metallic corrosion. If the content exceeds 5% by weight, then the benzotriazole-based metal-inactivating agent fails to be sufficiently dissolved in the solvent resulting in deposition in some cases, and the alkanolamine causes strong alkaline pH of the ink resulting in occurrence of corrosion ironically. The content is more preferably 0.05 to 3% by weight, and much more preferably 0.1 to 1% by weight. Especially preferably, the content is 0.1 to 0.4% by weight.

Additionally, the ink of the present invention may optionally contain, for example, hitherto known various types of penetrating agents, resin binders, dispersing agents, surfactants, viscosity-adjusting agents, surface tension-adjusting agents, pH-adjusting agents, dye-dissolving agents, antiseptic agents, and fungicides.

Those preferably used as the penetrating agent include polyhydric alcohol monoalkyl ether having low odor with low vapor pressure. Those preferably used as the polyhydric alcohol monoalkyl ether are those with which the quick-drying property of the ink on the paper is improved by effectively quicken the penetration speed of the ink into the recording paper to avoid the bleeding (blur at the boundary between different colors) resulting from the slow-drying property on the recording paper, and the feathering (moustache or whiskers-like blur along fibers of paper) is scarcely caused by the penetration.

The polyhydric alcohol monoalkyl ether includes, for example, diethylene glycol monomethyl ether, diethylene glycol monobutyl ether, diethylene glycol monoisobutyl ether, dipropylene glycol monomethyl ether, dipropylene glycol monopropyl ether, dipropylene glycol monoisopropyl ether, dipropylene glycol monobutyl ether, triethylene glycol monomethyl ether, triethylene glycol monobutyl ether, tripropylene glycol monomethyl ether, and tripropylene glycol monobutyl ether.

It is preferable that the content of the polyhydric alcohol monoalkyl ether is 3 to 15% by weight with respect to the total amount of the ink. If the content is less than 3% by weight, then the penetration speed of the ink into the recording paper is slow, and any problem arises in the drying time and the blur in some cases. If the content exceeds 15% by weight, the penetration of the ink into the recording paper is too quick. As a result, the ink arrives at the back of the recording paper in some cases, or any problem arises in the blur in other cases.

Monohydric alcohol such as ethanol and isopropyl alcohol can be also used for the water base ink for ink-jet recording of the present invention in order to control the penetration of the ink into the recording paper and the drying performance of the ink.

When the water base ink for ink-jet recording of the present invention is applied to the ink-jet system of the type in which the ink is discharged in accordance with the action of the thermal energy, for example, it is also preferable to adjust values of thermal physical properties including, for example, the specific heat, the coefficient of thermal expansion, and the coefficient of thermal conductivity.

The problem involved in the conventional technique is sufficiently solved in the water base ink for ink-jet recording of the present invention obtained as described above. The elution of nickel is not caused from the metal member disposed in the ink supply passage, and it is possible to suppress the metallic corrosion accompanied thereby as well.

The present invention will be explained in further detail below as exemplified by embodiments. However, the present invention is not limited to only the embodiments.

EXAMPLES 1 TO 9 AND COMPARATIVE EXAMPLES 1 TO 9

Compositions of inks prepared in Examples 1 to 9 and Comparative Examples 1 to 9 respectively are shown in Tables 1 to 18.

TABLE 1

| Ink composition of Example 1 | % by weight |
| --- | --- |
| C.I. Food Black 2 | 8 |
| Glycerol | 15 |
| Triethylene glycol-n-butyl ether | 8 |
| 1,2,3-Benzotriazole | 0.2 |
| Pure water | 68.8 |

TABLE 2

| Ink composition of Example 2 | % by weight |
|---|---|
| C.I. Direct Black 154 | 6 |
| Glycerol | 18 |
| Triethylene glycol-n-butyl ether | 8 |
| Triethanolamine | 0.1 |
| Pure water | 67.9 |

TABLE 3

| Ink composition of Example 3 | % by weight |
|---|---|
| C.I. Food Black 2 | 8 |
| Glycerol | 6 |
| Diethylene glycol | 10 |
| Triethylene glycol-n-butyl ether | 8 |
| Methyl-1H-benzotriazoleamine salt | 0.2 |
| Pure water | 67.8 |

TABLE 4

| Ink composition of Example 4 | % by weight |
|---|---|
| C.I. Food Black 2 | 2 |
| C.I. Direct Black 154 | 5 |
| Glycerol | 6 |
| Diethylene glycol | 10 |
| Triethylene glycol-n-butyl ether | 8 |
| 1,2,3-Benzotriazole sodium salt | 0.2 |
| Diethanolamine | 0.2 |
| Pure water | 68.6 |

TABLE 5

| Ink composition of Example 5 | % by weight |
|---|---|
| C.I. Food Black 2 | 3 |
| C.I. Direct Black 154 | 4 |
| Glycerol | 6 |
| Diethylene glycol | 10 |
| Triethylene glycol-n-butyl ether | 8 |
| Metyl-1H-benzotriazole | 0.2 |
| Triethanolamine | 0.1 |
| Pure water | 68.7 |

TABLE 6

| Ink composition of Example 6 | % by weight |
|---|---|
| C. I. Direct Yellow 132 | 3 |
| Glycerol | 28 |
| Triethylene glycol-n-butyl ether | 8 |
| Metyl-1H-benzotriazole | 0.1 |
| Diethanolamine | 0.1 |
| Pure water | 60.8 |

TABLE 7

| Ink composition of Example 7 | % by weight |
|---|---|
| C. I. Acid Red 52 | 1 |
| C. I. Acid Red 289 | 1.2 |
| Glycerol | 28 |
| Triethylene glycol-n-butyl ether | 8 |
| 1,2,3-Benzotriazole | 0.1 |
| Pure water | 61.7 |

TABLE 8

| Ink composition of Example 8 | % by weight |
|---|---|
| C. I. Direct Blue 199 | 2.5 |
| Glycerol | 28 |
| Diethylene glycol-n-butyl ether | 6 |
| Triethanolamine | 0.2 |
| Pure water | 63.3 |

TABLE 9

| Ink composition of Example 9 | % by weight |
|---|---|
| CABOJET 300 (produced by Cabot) | 27 (*note) |
| Glycerol | 5 |
| Diethylene glycol | 10 |
| Triethylene glycol-n-butyl ether | 5 |
| 1,2,3-Benzotriazole | 0.2 |
| Triethanolamine | 0.2 |
| Pure water | 52.6 |

*Note:
carbon black-dispersed material having pigment content of 15% by weight and water content of 85% by weight.

TABLE 10

| Ink composition of Comparative Example 1 | % by weight |
|---|---|
| C. I. Food Black 2 | 8 |
| Glycerol | 15 |
| Triethylene glycol-n-butyl ether | 8 |
| Pure water | 69 |

TABLE 11

| Ink composition of Comparative Example 2 | % by weight |
|---|---|
| C.I. Direct Black 154 | 6 |
| Glycerol | 18 |
| Triethylene glycol-n-butyl ether | 8 |
| Pure water | 68 |

TABLE 12

| Ink composition of Comparative Example 3 | % by weight |
|---|---|
| C.I. Food Black 2 | 8 |
| Glycerol | 6 |
| Diethylene glycol | 10 |
| Triethylene glycol-n-butyl ether | 8 |
| Pure water | 68 |

TABLE 13

| Ink composition of Comparative Example 4 | % by weight |
|---|---|
| C.I. Food Black 2 | 2 |
| C.I. Direct Black 154 | 5 |
| Glycerol | 6 |
| Diethylene glycol | 10 |
| Triethylene glycol-n-butyl ether | 8 |
| Pure water | 69 |

TABLE 14

| Ink composition of Comparative Example 5 | % by weight |
|---|---|
| C.I. Food Black 2 | 3 |
| C.I. Direct Black 154 | 4 |
| Glycerol | 6 |
| Diethylene glycol | 10 |
| Triethylene glycol-n-butyl ether | 8 |
| Pure water | 69 |

TABLE 15

| Ink composition of Comparative Example 6 | % by weight |
|---|---|
| C.I. Direct Yellow 132 | 3 |
| Glycerol | 28 |
| Triethylene glycol-n-butyl ether | 8 |
| Pure water | 61 |

TABLE 16

| Ink composition of Comparative Example 7 | % by weight |
|---|---|
| C. I. Acid Red 52 | 1 |
| C. I. Acid Red 289 | 1.2 |
| Glycerol | 28 |
| Triethylene glycol-n-butyl ether | 8 |
| Pure water | 61.8 |

TABLE 17

| Ink composition of Comparative Example 8 | % by weight |
|---|---|
| C. I. Direct Blue 199 | 2.5 |
| Glycerol | 28 |
| Diethylene glycol-n-butyl ether | 6 |
| Pure water | 63.5 |

TABLE 18

| Ink composition of Comparative Example 9 | % by weight |
|---|---|
| CABOJET 300 (produced by Cabot) | 27 (*note) |
| Glycerol | 5 |
| Diethylene glycol | 10 |
| Triethylene glycol-n-butyl ether | 5 |
| Pure water | 53 |

*Note:
carbon black-dispersed material having pigment content of 15% by weight and water content of 85% by weight.

The respective materials were sufficiently mixed and agitated for the inks of Examples 1 to 9 and Comparative Examples 1 to 9, followed by performing filtration with a membrane filter of 0.8 μm to use the obtained inks for the following evaluation.

Evaluation 1: Evaluation of Jetting Operation

A long term continuous jetting test was carried out at room temperature for 30 days for the inks of Examples 1 to 9 and Comparative Examples 1 to 9 respectively by using the ink-jet printer shown in FIGS. 1 to 10. Evaluation was made in accordance with the following criterion for the continuous jetting operation for 30 days:

++: neither discharge failure nor curvature was observed at all in the continuous jetting for 30 days;

+: no discharge failure was observed at all in the continuous jetting for 30 days, but any curvature was observed in a few cases, although the curvature was recovered in a short period of time;

±: any discharge failure was observed in a few cases, and any curvature was observed in a few cases in the continuous jetting for 30 days, in which both of the discharge failure and the curvature were not recovered in a short period of time; and −: any discharge failure and any curvature were observed in many cases in the continuous jetting for 30 days, in which both of the discharge failure and the curvature were not recovered in a short period of time. Results are shown in Table 19.

TABLE 19

| | Evaluation of metal piece by visual observation |
|---|---|
| Example 1 | + |
| Example 2 | + |
| Example 3 | + |
| Example 4 | ++ |
| Example 5 | ++ |
| Example 6 | ++ |
| Example 7 | + |
| Example 8 | + |
| Example 9 | ++ |
| Comparative Example 1 | − |
| Comparative Example 2 | − |
| Comparative Example 3 | − |
| Comparative Example 4 | − |
| Comparative Example 5 | − |
| Comparative Example 6 | ± |
| Comparative Example 7 | − |
| Comparative Example 8 | − |
| Comparative Example 9 | − |

Evaluation 2: Evaluation of Metallic Corrosion

A metal piece of alloy (surface area: about 4.5 cm$^2$, weight: about 1 g), which was composed of iron and nickel as a raw material for the metal member included in the ink supply passage, was immersed in about 20 mL of each of the inks of Examples 1 to 9 and Comparative Examples 1 to 9 to perform a test of being left to stand for 2 weeks under conditions of temperature of 60° C. and humidity of 40%. The amount of nickel element in the ink was quantitatively measured by means of the analysis method of ICP (plasma emission spectrochemical analysis) before and after the test of being left to stand. ICPS-10001V produced by Shimadzu was used for the ICP analysis apparatus. The surface of the metal piece after the test of being left to stand was observed to evaluate the degree of corrosion by visual observation. Evaluation criterion was as follows:

++: no corrosion appeared;

+: slight change of color was found on the metal piece surface;

±: corrosion area was about 1% to 5% of the surface area of the metal piece; and −: corrosion area was not less than about 5% of the surface area of the metal piece.

Results are shown in Table 20.

TABLE 20

|  | Elution amount of nickel, unit: ppm | Evaluation of metal piece by visual observation |
|---|---|---|
| Example 1 | 18 | + |
| Example 2 | 15 | + |
| Example 3 | 9 | + |
| Example 4 | 1 | ++ |
| Example 5 | 1 | ++ |
| Example 6 | 0 | ++ |
| Example 7 | 12 | + |
| Example 8 | 10 | + |
| Example 9 | 1 | ++ |
| Com. Ex. 1 | 54 | − |
| Com. Ex. 2 | 79 | − |
| Com. Ex. 3 | 57 | − |
| Com. Ex. 4 | 62 | − |
| Com. Ex. 5 | 59 | − |
| Com. Ex. 6 | 52 | ± |
| Com. Ex. 7 | 85 | − |
| Com. Ex. 8 | 68 | − |
| Com. Ex. 9 | 193 | − |

According to the results described above, the inks prepared in Examples 1 to 9 of the present invention made it possible to perform the stable jetting operation for a long term without causing the elution nickel from the metal member and the metallic corrosion accompanied thereby, making it possible to perform the highly reliable and highly accurate recording. On the other hand, the inks prepared in Comparative Examples 1 to 9 involved any problem in each of the evaluation items of the test.

The present invention has been constructed as described above. Therefore, according to the present invention, it is possible to perform the sufficiently highly accurate jetting operation in the long term continuous jetting test. Further, nickel is not eluted into the ink upon the long term contact between the ink and the metal member for the discharge head, and the metal member itself is not deteriorated by corrosion. Therefore, it is possible to realize the control of discharge and landing with a sufficiently high degree of accuracy.

What is claimed is:

1. An ink-jet printer, comprising:
   an ink-jet head which has at least a part of ink flow passage formed of nickel or nickel alloy;
   ink which contains at least one of benzotriazole-based metal-inactivating agent and alkanolamine so that the total amount of the benzotriazole based metal-inactivating agent and the alkanolamine is from 0.1% to 0.4% by weight of the weight of the ink; and
   an ink tank which accommodates the ink and which supplies the ink to the ink-jet head, wherein nickel is eluted in an amount of not more than 50 ppm from the ink-jet head to the ink.

2. The ink-jet printer according to claim 1, wherein the benzotriazole-based metal-inactivating agent is one selected from the group consisting of 1,2,3-benzotriazole, 1,2,3-benzotriazole sodium salt, methyl-1H-benzotriazole, and methyl-1H-benzotriazoleamine salt.

3. The ink jet printer according to claim 1, wherein the ink contains both benzotriazole based metal-inactivating agent and alkanolamine.

4. The ink-jet printer according to claim 1, wherein the ink-jet head comprises a plurality of stacked cavity plate and piezoelectric actuator layers.

5. The ink-jet printer according to claim 4, wherein the cavity plate is made of nickel alloy.

6. The ink jet printer according to claim 1, wherein the alkanolamine is triethanolamine or diethanolamine.

* * * * *